(12) United States Patent
Prochaska (10) Patent No.: US 6,659,402 B1
(45) Date of Patent: Dec. 9, 2003

(54) MODULAR AIRCRAFT SEAT SYSTEM

(75) Inventor: Charles R. Prochaska, Greenbank, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/214,238

(22) Filed: Aug. 7, 2002

(51) Int. Cl.[7] .................................................. B64P 11/06
(52) U.S. Cl. ................................................... 244/118.6
(58) Field of Search .......................... 244/122 R, 118.6, 244/128.6

(56) References Cited

U.S. PATENT DOCUMENTS 5,568,960 A * 10/1996 Oleson et al. ......... 297/344.22
5,647,634 A    7/1997 Presser et al.

* cited by examiner

Primary Examiner—Charles T. Jordan
Assistant Examiner—Jordan Lofdahl
(74) Attorney, Agent, or Firm—Ann K. Galbraith (57) ABSTRACT

A modular seating system (12) for a vehicle is provided. The seating system (12) includes at least one seat assembly (14) having a primary seat structure (24) and an integrated base panel (26), which is mechanically coupled to and actuateable with the primary seat structure (24). A base structure (22) is mechanically coupled to a vehicle support structure (16) and includes at least one attachment mechanism (76). The seat assemblies (14) are engageable with the attachment mechanisms (76). A method of installing the seating system (12) is also provided.

28 Claims, 4 Drawing Sheets

MODULAR AIRCRAFT SEAT SYSTEM

TECHNICAL FIELD

The present invention relates generally to aeronautical vehicle systems, and more particularly, to a method and system for modularizing aircraft seating.

BACKGROUND OF THE INVENTION

Aircraft passenger seating installation and attachment therein has remained mechanically uniform throughout aircraft industry. Most passenger aircraft use a similar installation system, which includes rigidly attaching a passenger seat assembly to an aircraft fuselage to prevent movement of the seat assembly during flight and in an event of a collision.

During installation, the passenger seat assembly is rigidly attached to an aircraft fuselage via a seat track. The seat track is attached to an aircraft frame or other rigid aircraft structure and extends in a fore and aft directions along a length of a passenger compartment. Counterbores exist at periodic increments along the seat track for installation of multiple passenger seat assemblies. A seat assembly includes a base containing multiple shear plugs. The seat assembly is typically pushed in a downward and forward direction relative to the seat track to insert the shear plugs on the seat assembly into the counterbores in the seat track. As the seat assembly is forced in a forward direction a forward portion of the base is inserted between a seat track lip and the seat track. The combination of the shear plugs locking within the counterbores and the presence of the seat track lips prevents movement of the seat assembly and provides structural restraint of the seat in the airplane.

Traditional passenger seating systems have multiple disadvantages. One disadvantage is that a single pair of seat track lips provide a limited amount of restraint and strength during a collision event. Therefore, to provide improved strength to retain a passenger seat, multiple seat track lips are required, which creates higher complexity in and more time involved to install a seat system.

Over time, passenger-seating systems have become increasingly complex, with an ever-increasing desire for more and more aircraft support systems to be incorporated. Some of the aircraft support systems are in-flight entertainment systems, ventilation and air-conditioning systems, emergency systems, assistance call systems, and lighting systems.

Also during installation each aircraft support system is electrically hard-wired or mechanically coupled to corresponding aircraft system components. Each aircraft support may have associated connectors and fasteners. Due to the increasing number of support systems, installation and removal of passenger seats has become more complex. Mechanical and electrical installation and removal entail significant labor and design costs. Additionally, maintenance and seat configuration change, such as changing seat pitch, are also labor intensive and costly.

Seat pitch refers to distance in a forward and aft direction between a point on a first seat assembly and the same point on a second seat assembly. The smaller the seat pitch, the more seating systems that may be incorporated into the passenger compartment. When seat pitch is changed many aircraft support system devices may no longer be able to attach to the aircraft support systems the aircraft system components, without altering, rewiring, or rerouting attachment mechanisms, or performing some other attachment or seating system adjustment. The additional labor to perform altering of the attachment mechanisms is also time intensive and costly.

Several aircraft support systems are not directly incorporated into a passenger seat system due to a potential for increased complexity, time, and labor that is involved in installation of the additional systems. It is desirable for the aircraft support systems to be incorporated into a seat system so as to be ergonomically accessible to passengers and reduce the amount of devices that exist in an over head panel. Labor to design and alter the aircraft support systems, within an over head panel, for various seat arrangements and the labor to manufacture the aircraft support systems into the aircraft are time intensive and costly. Incorporating the aircraft support systems into a seat system could potentially reduce the amount of systems that are designed into an aircraft structure.

Also aircraft system components may vary between aircraft, such that when transferring a seating system from a first aircraft to a second aircraft, support devices may again need to be altered to attach to the second aircraft.

It is therefore, desirable to provide an aeronautical seating system that minimizes complexity of and is less time consuming, user-friendly, and cost effective to install, remove, maintain, and reconfigure.

SUMMARY OF THE INVENTION

The present invention provides a method and system for modularizing aircraft seating. A modular seating system is provided. The seating system includes at least one seat assembly having a primary seat structure and an integrated base panel, which is mechanically coupled to and actuateable with the primary seat structure. A base structure is mechanically coupled to a vehicle support structure and includes at least one attachment mechanism. The seat assemblies are engageable with the attachment mechanisms.

A method of installing the seating system is also provided. The base structures are attached to the vehicle support structure. A forward portion of a first integrated seat panel is inserted between a rearward portion of a second integrated seat panel and the base structures. At least one seat leg is actuated to engage with at least one attachment mechanism in the base structures.

The present invention has several advantages over existing seating systems. One advantage of the present invention is that it allows single action connections without change to aircraft wiring, systems, or structure in a platform like structure that is mechanically attached to the seat primary structure.

Another advantage of the present invention is that it allows for seating installations to be performed or seating system configurations to be altered without causing aircraft support systems to be changed.

The aforementioned along with ease of installation minimizes the amount of time and labor intensity involved in installing and removing of the seat assembly.

Furthermore, the present invention allows aircraft support systems to be directly installed within a seat system and for various designs and combinations of features to be incorporated in a seat system without increasing complexity of installation.

The present invention itself, together with further objects and attendant advantages, will be best understood by reference to the following detailed description, taken in conjunction with the accompanying drawing.

DETAILED DESCRIPTION OF THE PREFERRED EMBODIMENT

In each of the following figures, the same reference numerals are used to refer to the same components. While the present invention is described with respect to a method and system for modularizing aircraft seating, the present invention may be adapted for various applications and systems including: aeronautical seating systems, land-based vehicle systems, or other applications or systems known in the art.

In the following description, various operating parameters and components are described for one constructed embodiment. These specific parameters and components are included as examples and are not meant to be limiting.

Also, in the following description the terms "attachment mechanism" may include: a latch, a pin, a washer, a hook, a bolt, a nut, a lock washer, a cotter pin, a rivet, a threaded fastener, or other fasteners or attachment mechanisms known in the art.

Additionally, the terms "aircraft support devices" may include an aircraft support system conduit, an air connector, an electrical connector, a pre-positioned connector receptacle, or other aircraft support devices known in the art.

Figure 1:
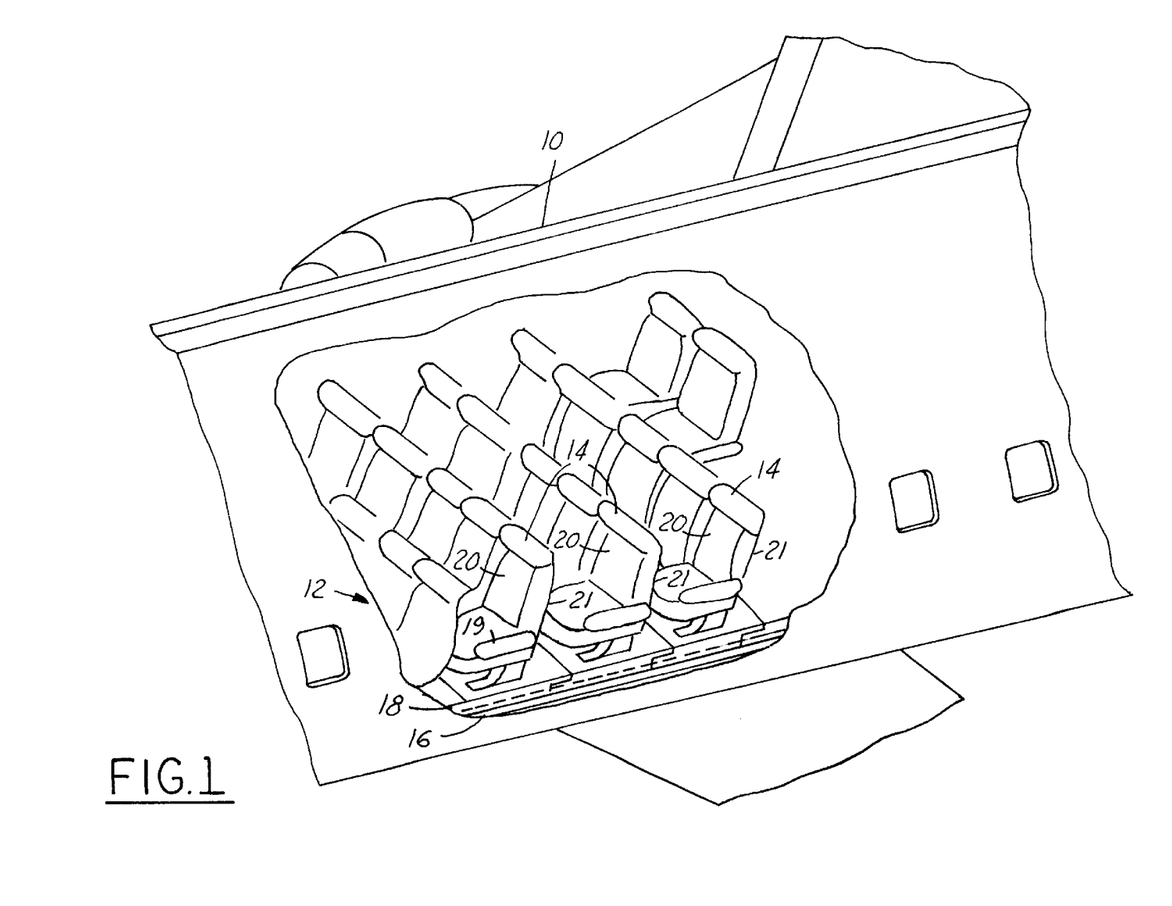
FIG. 1 is a perspective view of an aircraft incorporating a modular seating system in accordance with an embodiment of the present invention.

Referring now to FIG. 1, a perspective view of an aircraft 10 incorporating a modular seating system 12 in accordance with an embodiment of the present invention is shown. The modular seating system 12 includes multiple seat assemblies 14. The seat assemblies 14 are attached to an aircraft support structure 16, via seat retention rails 18. The aircraft support structure 16 may be a fuselage, a support frame, or other aircraft support structure known in the art. The seat assemblies 14 may be of various types, include various seat features, have associated aircraft support devices, multiple seating configurations, and other seat assembly characteristics, of which several are explained in more detail below. The seat features may include a seat pan 19, a seat cushion 20, a seat back 21 and other seat features, such as seat arms, actuation mechanisms, or other seat features known in the art. The seat assemblies 14 in being modular may be located in various positions along the seat retention rails 18 without a need for altering, rewiring, or rerouting aircraft support devices.

Figure 2:
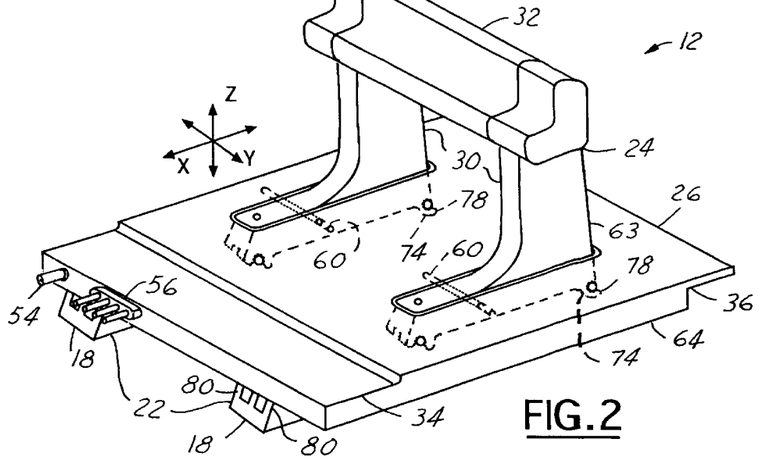
FIG. 2 is a perspective view of the modular seating system in accordance with an embodiment of the present invention.
Figure 3:
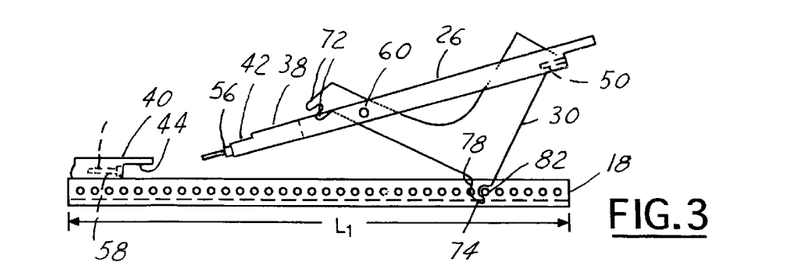
FIG. 3 is a cross-sectional view illustrating engagement of a seat assembly to a seat retention rail in accordance with an embodiment of the present invention.
Figures 4, 5, 6:
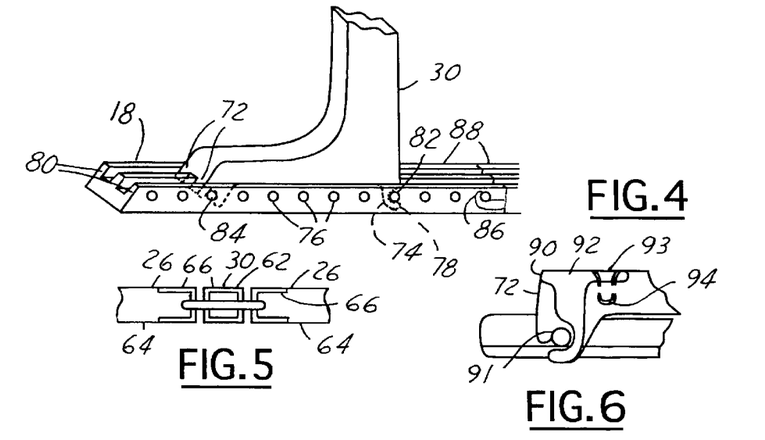
FIG. 4 is a perspective view of multiple attachment mechanisms engaging the primary seat structure with the seat retention rail in accordance with an embodiment of the present invention.
FIG. 5 is a sectional view of a pivoting pin attaching a primary seat structure to an integrated seat panel in accordance with an embodiment of the present invention.
FIG. 6 is a cross-sectional view of a latching mechanism in accordance with an embodiment of the present invention.

Referring now to FIGS. 2–4, respective views of a modular seating system 12 in accordance with an embodiment of the present invention are shown. The seating system 12 includes the seat assemblies 14 and a base structure 22. The seat assemblies 14 include a primary seat structure 24 and an integrated base panel 26, which is mechanically coupled to and relatively actuateable with the primary seat structure 24. The base structure 22 is mechanically coupled to the vehicle support structure 16 by a seat retention rail 18.

The primary seat structure 24 includes multiple legs 30 and a main seat frame anchor 32 that is mechanically coupled to the legs 30 and engageable with the various seat features. The primary seat structure 24 may be in an open folding configuration, that allows folding seat features, as shown or may be in a more conventional configuration. The open folding configuration allows for ease of passage within the aircraft 10. A passenger may fold the seat pan 19 towards the seat back 21 and pass in front of the seat assembly 14 without seat pan or seat leg interference, unlike that of conventional seat assemblies in which a seat pan is unable to fold towards a seat back and seat legs exist and support a forward portion of a seat pan.

The integrated base panels 26 for each seat assembly 14 are sequentially interlocked together. The integrated base panels 26 have matching forward contours 34 and rearward contours 36. For example, a first integrated base panel 38 is coupled to a second integrated base panel 40 by inserting a forward portion 42 of the first integrated base panel 38 between a rearward portion 44 of the second integrated base panel 40 and a seat retention rails 18. The rearward portion 44 prevents forward and upward displacement of the forward portion 42 relative to the seat retention rails 18 and provides for a smooth passenger floor surface without a gap between the integrated base panels 38 and 40.

Figure 7:
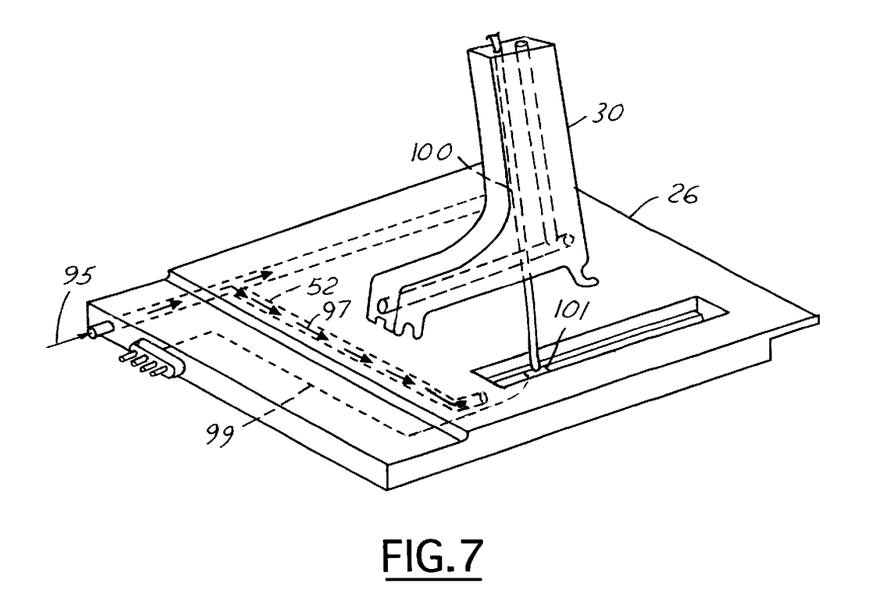
FIG. 7 is a perspective view illustrating electrical coupling and mechanical coupling between aircraft support devices in accordance with an embodiment of the present invention.

The integrated base panels 26 also include aircraft support devices 50, such as a system conduit 52, an air connector 54, an electrical connector 56, a pre-positioned connector receptacle 58, or other aircraft support structure known in the art. The system conduit 52 is best seen in FIG. 7. To support the sequentially interlocked configuration of the integrated base panels 26, each integrated base panel 26 has aircraft support devices that are pass-through devices. For example, the integrated base panels 26 may have male type connectors on the forward portion 42 and female style connectors on the rearward portion 44, which are coupled together through mechanical and electrical couplings, which are described in more detail below. When the first integrated base panel 38 is coupled to the second integrated base panel 40, male connectors on the first integrated base panel 38 are pressed together with female connectors on the second integrated base panel 40. The pass-through configuration provides increased speed and ease of installation of the seat assemblies 14.

The primary seat structure 24 is mechanically coupled to the integrated base panel 26 by a pivot pin 60. The legs 30 extend through slots 62 in the integrated base panel 26. The legs 30 and the integrated seat panel 26 have a first housing 63 and a second housing 64, respectively. The legs 30 and the integrated seat panel 26 may include reinforcement inserts 66 within the housings 63 and 64 to support the pivot pin 60, provide rigidity, and provide smooth actuation, as best seen in FIG. 5. Although the primary seat structure 24 is coupled to the integrated base panel 26 by a pivot pin 60, other actuateable coupling devices known in the art may be used.

The legs 30 and the seat retention rails 18 include attachment mechanisms 72 to allow for engagement of the primary seat structure 24 to the seat retention rails 18. In one embodiment of the present invention, the legs 30 include a forward pair of attachment mechanisms 72 and a rearward pair of attachment mechanisms 74. In the same embodiment, the seat retention rails 18 include attachment pins 76 at regular intervals. The attachment pins 76 are incorporated at approximately every inch interval along a first length $L_1$ of the seat retention rails 18, as shown. The attachment pins 76 allow for numerous seat assembly position adjustments relative to the set retention rails 18.

In a preferred embodiment, the seat retention rails 18 are in a 'W'-type configuration. The forward pair of attachment mechanisms 72 are in a 'U'-type configuration both in a longitudinal direction or along an x-axis and lateral direction or along an y-axis. The rearward pair of attachment mechanisms 74 are in a 'U'-type configuration in a longitudinal direction and have a pair of hooks 78. The attachment mechanisms 72 and 74 may be inserted between members 80 of the seat retention rails 18, such that the hooks 78 hook around a first attachment pin 82 and the forward pair of attachment mechanisms 72 hook around a second attachment pin 84.

The seat retention rails 18 may be unitary throughout the length of the vehicle 10 or may be segmented as shown. When the seat retention rails 18 are segmented, seat rail hooks 86 may be used to attach individual seat rail segments 88. The seat rail hooks 86 may be inserted within members 80 and engage with the attachment pins 76. Of course, other methods known in the art may be used to attach the members 80.

Referring now to FIG. 6, a cross-sectional view of a latching mechanism 90 in accordance with an embodiment of the present invention is shown. The forward pair of attachment mechanisms 72 may be in the form of the latching mechanism 90. The latching mechanism 90 has an open state and a closed state and provides positive attachment of the legs 30 to the seat retention rail 18. The open state exists when engaging the forward pair of attachment mechanisms 72 to an attachment pin 91. Upon engagement therein, a latching arm 92 is rotated to lock the forward pair of attachment mechanisms 72 to the attachment pin 91. A fastener 93 couples the latching arm 92 to the forward portion 38, via a threaded cavity 94. The fastener 93 may be used to prevent the latching arm 92 from releasing and returning the latching mechanism 90 to an open state. The latching mechanism 90 in combination with engagement of the rearward pair of attachment mechanisms 74 prevents fore, aft and upward displacement of the primary seat structure 24 relative to the base structure 22. Although, latching mechanism 90 is illustrated various other latching mechanisms known in the art may be used.

Referring now to FIG. 7, a perspective view illustrating electrical coupling and mechanical coupling between aircraft support devices 50 in accordance with an embodiment of the present invention is shown. To further support the sequentially interlocked configuration and to provide aircraft support systems directly within the seat assemblies 14, aircraft support devices 50 within the integrated seat panel 26 are coupled to other aircraft support devices 50 within the seat legs 30. One possible configuration is illustrated for supplying pressured air 95 and electrical line 96 directly to a seat assembly. The pressured air 95 may be used for air conditioning or for other air supply needs known in the art. The electrical line 96 may be audio line, video line, telecommunication line, or other line known in the art.

Pressured air 95 is supplied via a first channel or tube 97 in the integrated seat panel 26 to a second channel 98 in the legs 30. As the legs 30 are engaged to the seat retention rails 18 the first channel 97 is coupled to the second channel 98 using methods known in the art.

The electrical line 96 includes a first wire harness 99 in the integrated seat panel 26 electrically coupled to a second harness 100 in the legs 30 via connectors 101. Other electrical coupling methods known in the art may be used.

Figure 8:
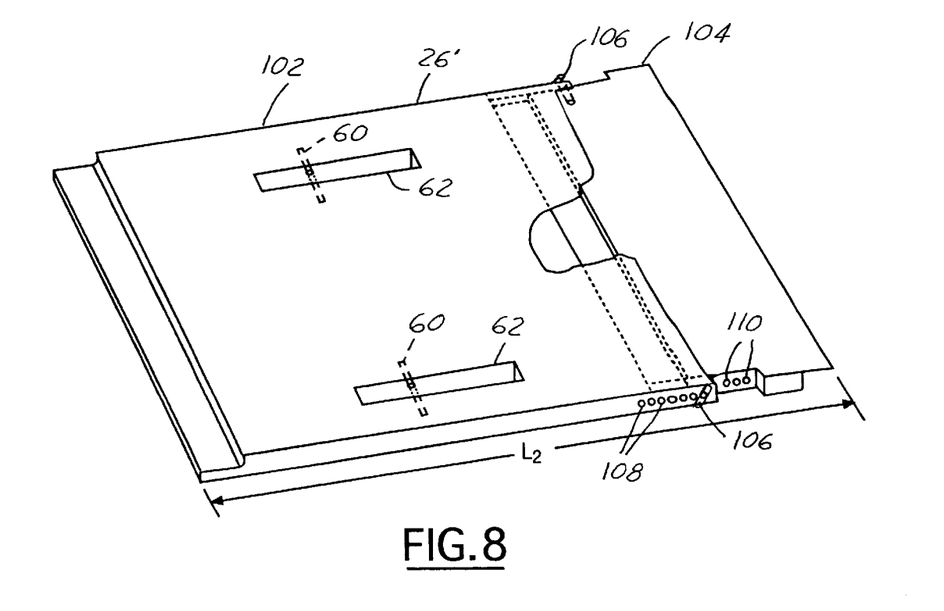
FIG. 8 is a perspective view of an adjustable integrated seat panel in accordance with another embodiment of the present invention.

Referring now to FIG. 8, a perspective view of an adjustable integrated seat panel 26' in accordance with another embodiment of the present invention is shown. A second length $L_2$, corresponding with the integrated seat panel 26', is adjustable. As shown, the integrated seat panel 26' may have a first section 102 and a second section 104 as opposed to being unitary in structure. The first section 102 is engageable with the second section 104 via pull pins 106. The second section 104 slides within and has determined interval locations relative to the first section 102. The pins 106 pass through a first set of channels 108 in the first section 102 into a second set of channels 110 in the second section 104. This adjustable configuration provides ease of seat assembly configuration adjustments, such as adjustment of seat pitch.

Figure 9:
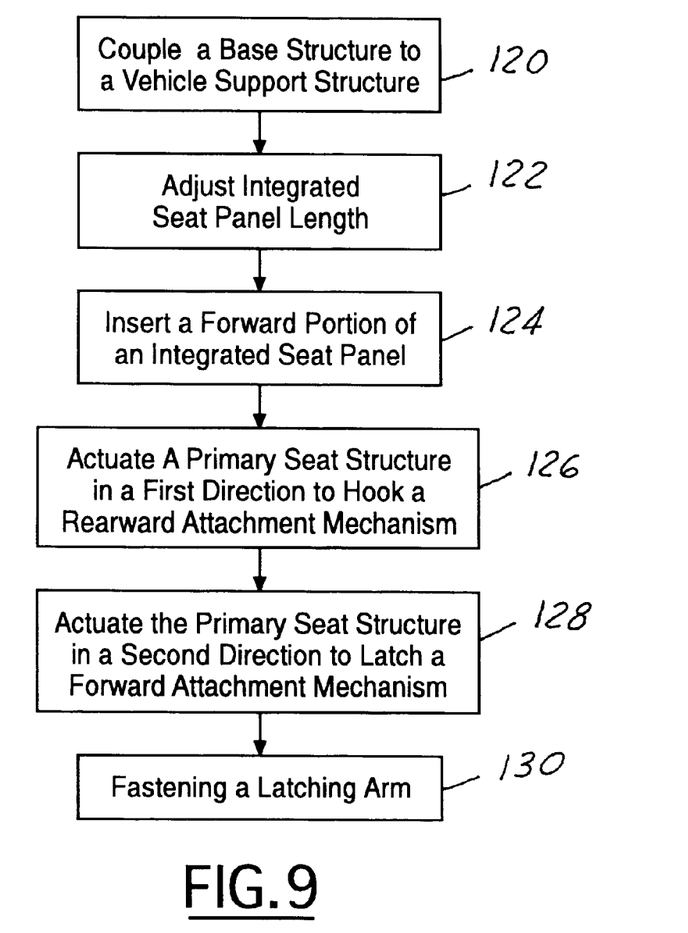
FIG. 9 is a logic flow diagram illustrating a method of installing a modular seating system in accordance with an embodiment of the present invention.

Referring now to FIG. 9, is a logic flow diagram illustrating a method of installing a modular seating system 12 in accordance with an embodiment of the present invention is shown.

In step 120, The base structure 22 is coupled to a vehicle support structure 16. As stated above the base structure 22 may be coupled to a vehicle frame or to a seat track. For ease of installation the primary seat structure 24 may be actuated into a first rotated position in order for the hook 78 to engage the attachment pin 82.

In step 122, the length of the integrated seat panels 26' may be adjusted as described above. Of course, the integrated seat panels 26' may be pre-set external to the aircraft 10 and prior to step 120.

In step 124, the forward portion 38 is inserted between the rearward portion 40 and the seat retention rail 18. The aircraft support devices 50 on the forward portion 38 are coupled to other aircraft support devices 50 on the integrated seat panel 26.

In step 126, when the primary seat structure 24 is not in the first rotated position the legs 30 are rotated in a first direction to hook the rearward pair of attachment mechanisms 74 around a first attachment pin 82, as best shown in FIG. 3.

In step 128, the legs 30 are rotated in a second direction opposite that of the first direction to engage the forward pair of attachment mechanisms 72 with the second attachment pin 84, thus positioning the primary seat structure 24 in a second rotated position. Upon completing step 108, the primary seat structure 24 is engaged with the seat retention rail 18.

In step 130, the latching arm 92 is rotated to the closed state and fastened to the first housing 63.

The above-described steps, are meant to be an illustrative example, the steps may be performed synchronously or in a different order depending upon the application, whether the integrated seat panel is adjustable, and types and styles of attachment mechanisms and latches used.

The present invention therefore provides a modular seating system that is relatively quick and easy to install and remove. The present invention minimizes complexity and installation and removal time and labor, thus being more efficient. The present invention also accommodates for seating systems to be efficiently reconfigured both individually and collectively without need for altering, rewiring, or rerouting of aircraft support devices and systems.

The above-described apparatus and method, to one skilled in the art, is capable of being adapted for various applications and systems including: aeronautical vehicles and systems, automotive vehicles and systems, control systems, or other applications or systems known in the art. The above-described invention can also be varied without deviating from the true scope of the invention.

What is claimed is:

1. A modular seating system for a vehicle comprising:
    at least one seat assembly comprising:
        a primary seat structure; and
        an integrated base panel mechanically coupled to and actuateable with said primary seat structure; and
    a base structure mechanically coupled to a vehicle support structure and having at least one attachment mechanism for engagement of said primary seat structure.

2. A modular seating system for a vehicle comprising:
    at least one seat assembly comprising:
        a primary seat structure; and
        an integrated base panel mechanically coupled to and actuateable with said primary seat structure; and
    a base structure mechanically coupled to a vehicle support structure and having at least one attachment mechanism;
    said at least one seat assembly engageable with said at least one attachment mechanism;
    wherein said primary seat structure is mechanically coupled to and relatively actuateable to said integrated base panel via a pivot pin.

3. A system as in claim 1 wherein said base structure comprises a seat retention rail.

4. A system as in claim 3 wherein said seat retention rail is coupled to a seat track.

5. A modular seating system for a vehicle comprising:
    at least one seat assembly comprising:
        a primary seat structure; and
        an integrated base panel mechanically coupled to and actuateable with said primary seat structure; and
    a base structure mechanically coupled to a vehicle support structure and having at least one attachment mechanism;
    said at least one seat assembly engageable with said at least one attachment mechanism;
    wherein a first integrated base panel is sequentially interlocked with a second integrated base panel.

6. A modular seating system for a vehicle comprising:
    at least one seat assembly comprising:
        a primary seat structure; and
        an integrated base panel mechanically coupled to and actuateable with said primary seat structure; and
    a base structure mechanically coupled to a vehicle support structure and having at least one attachment mechanism;
    said at least one seat assembly engageable with said at least one attachment mechanism;
    wherein a forward contour of a first integrated base panel matches a rearward contour of a second integrated base panel.

7. A modular seating system for a vehicle comprising:
    at least one seat assembly comprising:
        a primary seat structure; and
        an integrated base panel mechanically coupled to and actuateable with said primary seat structure; and
    a base structure mechanically coupled to a vehicle support structure and having at least one attachment mechanism;
    said at least one seat assembly engageable with said at least one attachment mechanism;
    wherein a rearward portion of a second integrated base panel prevents forward and upward displacement of at least a portion of a first integrated base panel relative to said base structure.

8. A modular seating system for a vehicle comprising:
    at least one seat assembly comprising:
        a primary seat structure; and
        an integrated base panel mechanically coupled to and actuateable with said primary seat structure; and
    a base structure mechanically coupled to a vehicle support structure and having at least one attachment mechanism;
    said at least one seat assembly engageable with said at least one attachment mechanism;
    wherein said primary seat structure comprises;
        at least one seat leg; and
        a main seat frame anchor mechanically coupled to said at least one seat leg and engageable with a plurality of seat features.

9. A system as in claim 8 wherein said plurality of seat features are selected from at least one of a seat pan, a seat cushion, a seat back, seat arms, and actuation mechanisms.

10. A modular seating system for a vehicle comprising:
    at least one seat assembly comprising:
        a primary seat structure; and
        an integrated base panel mechanically coupled to and actuateable with said primary seat structure; and
    a base structure mechanically coupled to a vehicle support structure and having at least one attachment mechanism;
    said at least one seat assembly engageable with said at least one attachment mechanism;
    wherein said integrated base panel comprises an aircraft support device selected from at least one of a system conduit, an air connector, an electrical connector, and a pre-positioned connector receptacle.

11. A modular seating system for a vehicle comprising:
    at least one seat assembly comprising:
        a primary seat structure; and
        an integrated base panel mechanically coupled to and actuateable with said primary seat structure; and
    a base structure mechanically coupled to a vehicle support structure and having at least one attachment mechanism;
    said at least one seat assembly engageable with said at least one attachment mechanism;
    wherein a first integrated base panel comprises a first set of aircraft support devices and a second integrated base panel comprises a second set of aircraft support devices coupled to said first set of aircraft support devices.

12. A modular seating system for a vehicle comprising:
at least one seat assembly comprising:
a primary seat structure; and
an integrated base panel mechanically coupled to and actuateable with said primary seat structure; and
a base structure mechanically coupled to a vehicle support structure and having at least one attachment mechanism;
said at least one seat assembly engageable with said at least one attachment mechanism;
wherein said at least one seat assembly engages with said at least one attachment mechanism by rotational actuation of said seat assembly in combination with a latching mechanism.

13. A modular seating system for a vehicle comprising:
at least one seat assembly comprising:
a primary seat structure; and
an integrated base panel mechanically coupled to and actuateable with said primary seat structure; and
a base structure mechanically coupled to a vehicle support structure and having at least one attachment mechanism;
said at least one seat assembly engageable with said at least one attachment mechanism;
wherein said at least one seat assembly engages with said at least one attachment mechanism by rotating said primary seat structure in a first direction and by rotating said integrated base panel in a second direction.

14. A modular seating system for a vehicle comprising:
at least one seat assembly comprising:
a primary seat structure; and
an integrated base panel mechanically coupled to and actuateable with said primary seat structure; and
a base structure mechanically coupled to a vehicle support structure and having at least one attachment mechanism;
said at least one seat assembly engageable with said at least one attachment mechanism;
wherein said at least one attachment mechanism comprises a plurality of attachment pins.

15. A modular seating system for a vehicle comprising:
at least one seat assembly comprising:
a primary seat structure; and
an integrated base panel mechanically coupled to and actuateable with said primary seat structure; and
a base structure mechanically coupled to a vehicle support structure and having at least one attachment mechanism;
said at least one seat assembly engageable with said at least one attachment mechanism;
wherein said primary seat structure comprises a latching mechanism engaging with a first attachment mechanism and wherein a rearward portion of said primary seat structure engages with a second attachment mechanism, said latching mechanism in combination with said engagement of said rearward portion and said second attachment mechanism preventing fore, aft and upward displacement of said primary seat structure relative to said base structure.

16. A method of installing a modular seating system in a vehicle comprising:
attaching a base structure to a vehicle support structure;
inserting a forward portion of a first integrated seat panel between a rearward portion of a second integrated seat panel and said base structure; and
actuating at least one seat leg to engage with at least one attachment mechanism in said base structure.

17. A method as in claim 16 wherein actuating at least one seat leg comprises:
performing a first actuation of at least one seat leg to engage with a first attachment mechanism in said base structure; and
performing a second actuation of said at least one leg to engage with a second attachment mechanism.

18. A method as in claim 16 wherein inserting a forward portion of a first integrated seat panel comprises engaging at least one aircraft support device on said first integrated seat panel with an aircraft support device on said second integrated seat panel.

19. A method as in claim 16 wherein attaching said base structure to a vehicle support structure comprises attaching said seat retention rail to a seat track.

20. A method as in claim 16 further comprising adjusting length of said first integrated seat panel.

21. A modular seating system for a vehicle comprising:
at least one seat assembly comprising:
a primary seat structure; and
an integrated base panel mechanically coupled to and actuateable with said primary seat structure via a pivot pin; and
a base structure mechanically coupled to a vehicle support structure and comprising a seat retention rail having a plurality of attachment mechanisms;
said primary seat structure engageable with said plurality of attachment mechanisms.

22. A modular seating system for a vehicle comprising:
a plurality of seat assemblies comprising:
a plurality of primary seat structures; and
a plurality of integrated base panels directly coupled to each other and mechanically coupled to and actuateable with said plurality of primary seat structures; and
a base structure mechanically coupled to a vehicle support structure and having at least one attachment mechanism;
said plurality of seat assemblies engageable with said at least one attachment mechanism.

23. A modular seating system for a vehicle comprising:
at least one seat assembly comprising:
a primary seat structure; and
an integrated base panel mechanically coupled to and actuateable with said primary seat structure and having at least one aircraft support structure; and
a base structure mechanically coupled to a vehicle support structure and having at least one attachment mechanism;
said at least one seat assembly engageable with said at least one attachment mechanism.

24. A modular seating system for a vehicle comprising:
a plurality of modular interlocking seat assemblies comprising;
a first modular interlocking seat assembly; and
a second modular interlocking seat assembly interlocked with and coupled to said first modular interlocking seat assembly.

25. A system as in claim 24 wherein said plurality of modular interlocking seat assemblies comprise at least one aircraft support structure.

26. A system as in claim 1 wherein said at least one seat assembly has a engage state and a disengaged state and wherein said primary seat structure is rotated relative to said integrated base panel to transition between said engage state and said disengage state.

27. A system as in claim 26 wherein a portion of said primary seat structure is approximately parallel with said integrated base panel when in said engaged state.

28. A system as in claim 26 wherein horizontal length of said at least one seat assembly relative to said base structure is greater when in said engaged state than when in said disengaged state.

* * * * *